UNITED STATES PATENT OFFICE.

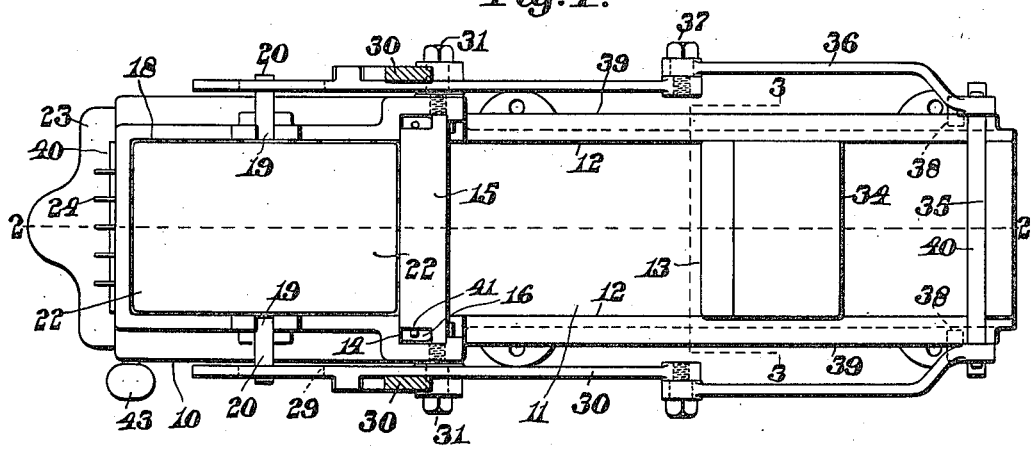
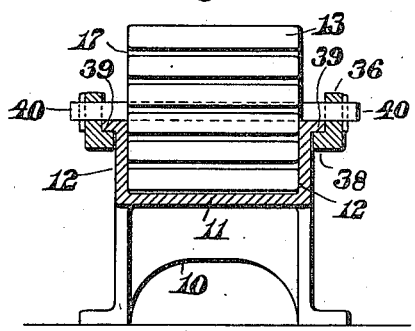
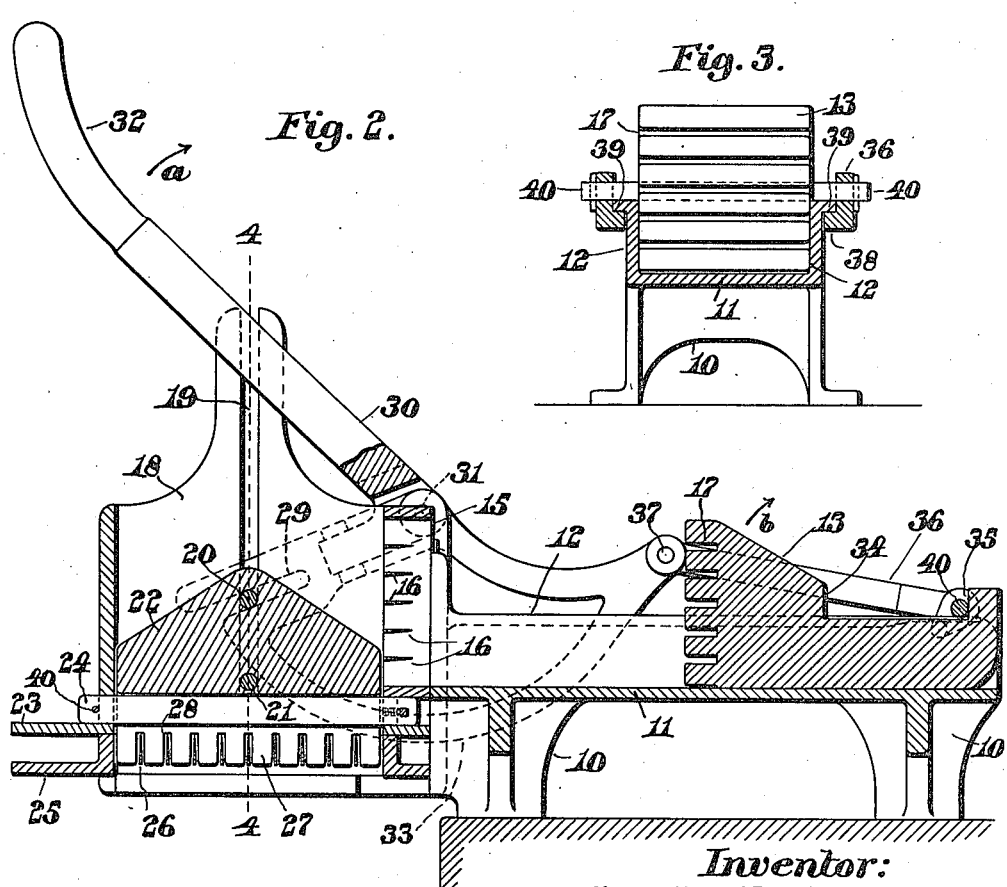

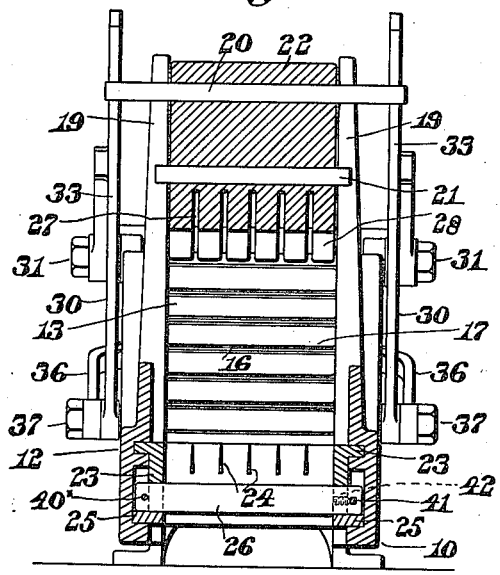
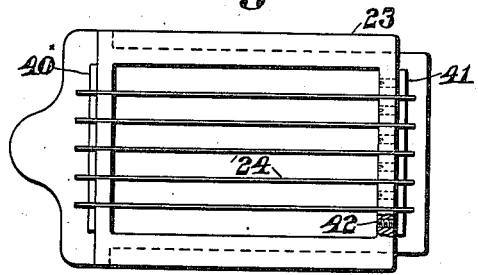
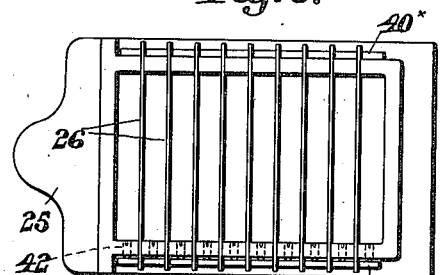
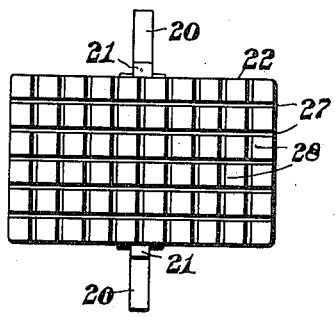
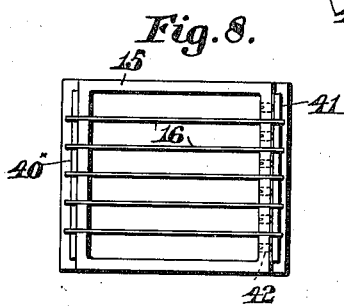

CHARLES P. NUTTER, OF MALDEN, MASSACHUSETTS.

VEGETABLE-CUTTER.

1,218,577.     Specification of Letters Patent.     Patented Mar. 6, 1917.

Application filed July 9, 1915. Serial No. 39,170.

*To all whom it may concern:*

Be it known that I, CHARLES P. NUTTER, a citizen of the United States of America, and a resident of Malden, in the county of Middlesex and Commonwealth of Massachusetts, have invented certain new and useful Improvements in Vegetable-Cutters, of which the following is a specification.

This invention relates to vegetable cutters and has for its object the provision of a machine of this character which is adapted to slice vegetables, to cut the slices into strips, or to divide the strips into smaller parts, as desired.

The invention consists of certain novel features of construction and arrangement of parts which will be fully understood by reference to the description of the drawings and to the claims hereinafter given.

Of the drawings:

Figure 1 represents a plan of a machine embodying the principles of the present invention.

Fig. 2 represents a longitudinal vertical section on line 2—2 on Fig. 1.

Fig. 3 represents a transverse vertical section of the machine looking toward the horizontally movable plunger and showing in section the members for preventing the lifting of said plunger when in operative position.

Fig. 4 represents a transverse vertical section on line 4—4 on Fig. 2.

Fig. 5 represents a plan of one of the bottom knife frames.

Fig. 6 represents a plan of the other bottom knife frame.

Fig. 7 represents an inverted plan of the plunger adapted to coact with the knives in said frames, and Fig. 8 represents an elevation of the vertical knife adapted to coact with the plunger shown in Fig. 3.

Similar characters designate like parts throughout the several figures of the drawings.

In the drawings, 10 is a frame having a bed plate 11 having upwardly extending side walls 12 between which is adapted to be reciprocated a plunger 13 movable along the upper face of said bed plate 11. The side walls 12 of the frame 10 are provided with opposed vertical grooves 14 in which is mounted a rectangular frame 15 provided with a plurality of knives 16 parallel to the upper face of the bed plate 11. These knives 16 are spaced apart equal distances and the plunger 13 is provided with a plurality of grooves 17 adapted to receive said knives 16 when the plunger 13 is moved to its extreme position to the left of Fig. 2. When in this position the operating face of said plunger will form a side wall to the bottomless chamber 18 formed in the frame 10 at one end of the bed plate 11. The opposite side walls 12 of the chamber 18 are provided with opposed slots 19 into which project trunnions 20 and 21 extending through a reciprocating plunger 22 adapted to be reciprocated vertically in said chamber 18. Beneath the level of the upper face of the bed plate 11 and at the bottom of the chamber 18 is a removable rectangular frame 23 provided with a plurality of parallel knives 24 perpendicular to the knives 16.

Beneath the frame 23 is another removable frame 25 provided with a plurality of knives 26 parallel to each other and perpendicular to the knives 24. The bottom of the plunger 22 is provided with a plurality of parallel grooves 27 adapted to receive the knives 24 when the plunger is in its lowest position and is also provided with a plurality of parallel grooves 28 adapted to receive the knives 26. The trunnions 20 in the plunger 22 extend considerably beyond the side walls of the chamber 18 and are positioned in radial slots 29 in the bifurcated operating member 30 pivoted at 31 to the side frames 12 of the frame 10. This operating member 30 is provided with a handle 32 by which oscillatory movement may be imparted thereto about its pivot 31. This bifurcated member 30 is provided with a cam surface 33 which is adapted to coact with the trunnions 20 when the plunger 22 is in its upper position and prevent downward movement of said plunger until the member 30 has been moved about its pivot sufficiently to allow the trunnions 20 to again enter the slots 29 therein.

The horizontally movable plunger 13 resting upon the upper face of the bed plate 11 is cut away at its upper end, thereby forming the separated shoulders 34 and 35. A bail 36 pivoted at 37 to the bifurcated member 30 is adapted to alternately engage the shoulders 34 and 35, as the operating member 30 is oscillated about its pivot 31. This bail 36 is provided with inwardly extending lugs 38 which engage the under face of a flange 39 extending outwardly from the side frames 12 at the opposite edges of the bed plate 11. These lugs 38 prevent the displacement of the bail 36 retaining the cross rod 40 thereof against the upper edges of the side frames 12 during the reciprocatory movement of the plunger 13.

The knives 16, 24 and 26 are positioned respectively in slits in their rectangular frames 15, 23, and 25, and the ends of these knives extend beyond the outer walls of said rectangular frames and have rods 40×—41 extending through holes in said projecting ends. In each case the rod 41 may be forced outwardly from the outer wall of its rectangular frame by means of a plurality of adjusting members 42 threaded to said rectangular frame as indicated in Figs. 5, 6, and 8 of the drawings. It is obvious that by adjusting these threaded members 42 the knives of the various rectangular frames may be drawn perfectly taut. The cutting edges of the knives 16, 24, and 26 are always positioned toward the plungers 13 and 22 with which they coact. The various parts of the machine are normally in the position indicated in Figs. 1 and 2 of the drawings. When in this position a vegetable such as a potato may be placed upon the bed plate 11 at the left of the plunger 13. The operator then seizes the handle 32 and moves it in the direction of the arrow $a$ on Fig. 2 of the drawings. This will cause the cross rod 40 to move to the left from the shoulder 35 into contact with the shoulder 34, and subsequently push the plunger 13 along the bed plate 11, forcing the vegetable through the rectangular frame 15 and causing it to be cut into slabs by means of the knives 16. During the movement of the rod 40 from the shoulder 35 until it contacts with the shoulder 34, the lever 30 will be lifting the plunger 22 so that it will be out of the way of the vegetable which will be forced into the chamber as soon as the rod 40 comes into contact with the shoulder 34, and continuing its movement forces the plunger 13 toward the knives 16. The portion of the plunger 13 between the grooves 17 will enter the spaces between the knives 16 and the operating face of the plunger 13 will form one wall of the vertical bottomless chamber 18 while in this position.

During this movement of the plunger 13 the movement of the bifurcated operating member 30 about its pivot 31 will cause the plunger 22 to be lifted into its highest position and be retained in such highest position by means of the cam surface 33 supporting the trunnions 20. It is obvious from an inspection of the drawings that the lifting of the plunger 22 occurs while the cross rod 40 is moving from the shoulder 35 to the shoulder 34, thus removing the plunger 22 from the path of the vegetable when it is forced through the rectangular frame 15 into the chamber 18 by the plunger 13. While the plunger 22 is in its uppermost position the trunnion 20 will rest upon the curved edge 33 of the lever 30.

When the vegetable separated into slabs has been deposited in the chamber 18 it will rest upon the cutting edges of the knives 24. The operator then moving the handle 32 in a direction opposite that indicated by the arrow $a$ on Fig. 2 of the drawings will cause the curved edge 33 to be removed from beneath the trunnions 20 and permit the latter to enter the slots 29 and move the plunger 22 downwardly forcing the separated slabs of vegetable through the rectangular frames 23 and 25, thereby subdividing the slabs of vegetable first into strips and then into smaller subdivisions such as cubes, these subdivisions dropping into any suitable receptacle positioned beneath the bottom of the chamber 18. During the downward movement of the plunger 22 the cross member 40 is moving from contact with the shoulder 34 into contact with the shoulder 35 and after the plunger 22 has reached its lowest position the continued movement of the oscillating member 30 will return the plunger 13 to its normal position preparatory to another operation. As shown in the drawings, with all of the rectangular frames 15, 23, and 25 in use, the vegetable being operated upon will be divided into small subdivisions adapted for use in soups, etc. If it is desired to cut the vegetable into strips, as for instance, a potato into strips for French frying, the rectangular frame 25 is removed. When it is desired to have German fried potatoes, both the rectangular frames 23 and 25 are removed and the plunger 13 forces the potato through the rectangular frame 15 into the chamber 18 from which it is forced by the plunger 22 without being further subdivided. The knife frames 23 and 25 are held in position by means of the clamping members 43. It is obviously of great advantage to be able to subdivide the vegetables with instrumentalities actuated by a single operating handle, thereby permitting the operator to use the other hand to place new vegetables upon the bed plate.

This machine is especially adapted for hotels and restaurants, and is very effective in its operation. Preferably the plungers 13 and 22 are made of hard wood and when the plunger 13 is in the position shown in Fig. 2 of the drawings it may be removed for cleansing by moving its forward end in the direction of the arrow $b$ on said figure. In a similar manner the plunger 22 may be removed for cleansing by lifting it until the trunnions 20 and 21 are removed from the slots 19.

As has been previously stated, the rectangular knife frames 15, 23, and 25 are all removable and when these frames and the plungers have been removed the bed plate 11 and the chamber 18 may be cleansed with little difficulty.

It is believed that the operation and many advantages of this invention will be fully understood from the foregoing description.

Having thus described my invention, I claim:

1. In a device of the class described, the combination of a frame having a bed plate and a bottomless chamber at one end thereof perpendicular to said bed plate; a plunger movable lengthwise of said bed plate; a plunger movable lengthwise of said chamber; a plurality of knives in the wall of said chamber between said plungers; a manually actuated lever for reciprocating both of said plungers; and means associated with said lever for effecting a standstill of said bed plate plunger at the end of its movement in each direction.

2. In a device of the character described, the combination of a bed plate; means for separating a vegetables supported on said bed plate into a plurality of slabs; means for subsequently dividing said slabs into strips; and a single oscillating member for operating said separating means and dividing means simultaneously during a part of each oscillation.

3. In a device of the character described, the combination of a bed plate; means for separating a vegetable supported on said bed plate into a plurality of slabs; means for subsequently dividing said slabs into cubes; and a single oscillating member for operating said separating means and dividing means simultaneously during a part of each oscillation.

4. In a device of the character described, the combination of a bed plate adapted to support a vegetable; a manually actuated oscillating operating member; means including a plunger operable by the movement of said member in one direction to separate said vegetable into slabs; and means including another plunger operable by the movement of said member in the opposite direction for dividing said slabs into smaller parts.

5. In a device of the character described, the combination of a frame having a bed plate and a bottomless chamber at one end, two opposite walls of which are provided with guide members below said bed plate; a rectangular frame slidably mounted in said frame at the side of said chamber and extending upwardly above the level of said bed plate; a plurality of horizontal knives in said frame parallel to said bed plate; means for forcing a vegetable against and beyond said knives into said chamber; a rectangular frame provided with flanged portions on two opposite sides slidably mounted on said guide members; a plurality of parallel knives mounted in said slidable bottom frame; and means for subsequently forcing the divided portions of said vegetable from the bottom of said chamber beyond the knives positioned therein.

6. In a device of the character described, the combination of a frame having a bed plate and a bottomless chamber at one end, two opposite walls of which are provided with guide members below said bottom plate; a rectangular frame slidably mounted in said frame at the side of said chamber and extending upwardly above the level of said bed plate; a plurality of horizontal knives in said frame parallel to said bed plate; means for forcing a vegetable against and beyond said knives into said chamber; two rectangular frames slidably mounted on said guide members, each having flanged portions on two opposite sides of said frames; parallel knives mounted in each rectangular frame, the knives in one frame being parallel to said flanged portions and in the other being perpendicular to said flanged portions; and means for subsequently forcing the separated portions of said vegetable from the bottom of said chamber beyond the knives positioned therein.

7. In a device of the class described, the combination of a frame having a bed plate and a bottomless chamber at one end; a plurality of knives at the side of said chamber above and parallel to said bed plate; a plurality of knives extending across the bottom of said chamber; a plunger adapted to be moved downwardly in said chamber having slots therein adapted to receive the coacting knives in the extreme of its downward movement; a plunger on said bed plate having slots to receive its coacting knives at the extreme of its movement in one direction, and having two separated shoulders; an operating member for the chamber plunger; and a bail pivoted thereto adapted to alternately engage said shoulders.

8. In a device of the class described, the combination of a frame having a bed plate and a bottomless chamber at one end; a plurality of knives at the side of said chamber above and parallel to said bed plate; a plunger adapted to be moved downwardly in said chamber; a plunger on said bed plate having slots to receive its coacting knives at the extreme of its movement in one direction and having two separated shoulders; an operating member for the chamber plunger; and a bail pivoted thereto adapted to alternately engage said shoulders.

9. In a device of the class described, the combination of a frame having a bed plate and a bottomless chamber at one end thereof; a plurality of knives at the side of said chamber above and parallel to said bed plate; a plunger movable on said bed plate adapted to force a vegetable against and beyond said knives; a plunger in said chamber; and a device for operating said bed plate plunger and said chamber plunger including means for retaining the latter immovable in elevated position during the forward movement of the bed plate plunger and with its operating face in alinement with the upper face of said bed plate plunger.

10. In a device of the class described, the combination of a frame having a bed plate and a bottomless chamber at one end thereof; a plurality of knives at the side of said chamber above and parallel to said bed plate; a plunger movable on said bed plate adapted to force a vegetable against and beyond said knives; a plunger in said chamber; trunnions on said chamber plunger extending through vertical slots in said frame; an oscillating operating member having radial slots to receive said trunnions and raise said chamber plunger and having cam surfaces adapted to engage said trunnions at the extreme upward movement of the chamber plunger and retain said plunger in such elevated position during the forward movement of the bed plate plunger; and means connected to said oscillating member for effecting a reciprocation of said bed plate plunger.

11. In a device of the class described, a rectangular frame having a plurality of alined slots at opposite ends; knives in said slots with their ends extending beyond the walls thereof; rods extending through openings in said extending ends; and a plurality of members threaded to said frame and bearing against one of said rods on opposite sides of each of said knives whereby said knives may be drawn taut.

12. In a device of the class described, the combination of a frame having a bed plate and a bottomless chamber at one end; a plurality of knives at the side of said chamber above and parallel to said bed plate; a plurality of knives extending across the bottom of said chamber; a plunger adapted to be moved downwardly in said chamber having slots therein adapted to receive the coacting knives in the extreme of its downward movement; a plunger on said bed plate having slots to receive its coacting knives at the extreme of its movement in one direction, and having two separated shoulders; an operating member for the chamber plunger; a bail pivoted thereto adapted to alternately engage said shoulders; and means for preventing the accidental displacement of said bail.

13. In a device of the class described, the combination of a frame having a bed plate and a bottomless chamber at one end; a plurality of knives at the side of said chamber above and parallel to said bed plate; a plurality of knives extending across the bottom of said chamber; a plunger adapted to be moved downwardly in said chamber having slots therein adapted to receive the coacting knives in the extreme of its downward movement; a plunger on said bed plate having slots to receive its coacting knives at the extreme of its movement in one direction, and having two separated shoulders; an operating member for the chamber plunger; a bail pivoted thereto adapted to alternately engage said shoulders; and lugs on said bail engaging flanges on said bed plate to retain said bail in operative position.

14. In a device of the class described, the combination of a frame having a bed plate and a bottomless chamber at one end thereof perpendicular to said bed plate; a plunger movable lengthwise of said bed plate; a plunger movable lengthwise of said chamber; a plurality of knives in the wall of said chamber between said plungers; a manually actuated lever for reciprocating both of said plungers; means associated with said lever for effecting a standstill of said bed plate plunger at the end of its movement in each direction; and mechanism controlled by said lever for retaining said chamber plunger immovable in its raised position a predetermined time.

15. In a device of the class described, the combination of a frame having a bed plate and a bottomless chamber at one end thereof perpendicular to said bed plate; a plunger movable lengthwise of said bed plate; a plunger movable lengthwise of said chamber; a plurality of knives in the wall of said chamber between said plungers; a manually actuated lever for reciprocating both of said plungers; and mechanism controlled by said lever for retaining said chamber plunger immovable in its raised position a predetermined time.

16. In a device of the class described, the combination of a frame having a bed plate and a bottomless chamber at one end thereof perpendicular to said bed plate; a plunger movable lengthwise of said bed plate; a plunger movable lengthwise of said chamber; a plurality of knives in the wall of said chamber between said plungers; a plurality of knives in the bottom of said vertical chamber; a manually actuated lever for reciprocating both of said plungers; and means associated with said lever for effecting a standstill of said bed plate plunger at the end of its movement in each direction.

17. In a device of the class described, the combination of a frame having a bed plate and a bottomless chamber at one end thereof perpendicular to said bed plate; a plunger movable lengthwise of said bed plate; a plunger movable lengthwise of said chamber; a plurality of knives in the wall of said chamber between said plungers; a bifurcated lever straddling said frame and pivoted to the side walls thereof; a handle for actuating said lever; and means associated with said lever for effecting reciprocatory movements of both plungers during each oscillation.

18. In a device of the class described, the combination of a frame having a bed plate and a bottomless chamber at one end thereof perpendicular to said bed plate; a plunger movable lengthwise of said bed plate; a plunger movable lengthwise of said chamber; a plurality of knives in the wall of said chamber between said plungers; a bifurcated lever straddling said frame and pivoted to the side walls thereof; a handle for actuating said lever; and means associated with said lever for effecting reciprocatory movements of both plungers during each oscillation and effecting a standstill of said bed plate plunger at the end of its movement in each direction.

Signed by me at 4 Post Office Sq., Boston, Mass., this 7th day of July, 1915.

CHARLES P. NUTTER.

Witnesses:
WALTER E. LOMBARD,
EDWARD F. ALLEN.